(12) United States Patent
Alberth

(10) Patent No.: US 9,104,233 B2
(45) Date of Patent: *Aug. 11, 2015

(54) METHOD AND DEVICE FOR VISUAL COMPENSATION

(75) Inventor: William P. Alberth, Prairie Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 13/533,937

(22) Filed: Jun. 26, 2012

(65) Prior Publication Data

US 2012/0268366 A1    Oct. 25, 2012

Related U.S. Application Data

(63) Continuation of application No. 12/645,557, filed on Dec. 23, 2009, now Pat. No. 8,305,433.

(51) Int. Cl.
  *H04N 7/18*    (2006.01)
  *A61B 3/00*    (2006.01)
  *G06F 3/01*    (2006.01)
  *G06F 3/048*   (2013.01)
  *G09B 21/00*   (2006.01)

(52) U.S. Cl.
  CPC ............. *G06F 3/011* (2013.01); *G06F 3/012* (2013.01); *G06F 3/048* (2013.01); *G09B 21/008* (2013.01)

(58) Field of Classification Search
  CPC ............. G02B 2027/0138; G02B 2027/014; G02B 2027/0118; G09B 21/001; H04N 1/19594
  See application file for complete search history.

(56) References Cited

U.S. PATENT DOCUMENTS

| 6,819,783 | B2 | 11/2004 | Goldberg et al. |
| 7,517,086 | B1 * | 4/2009 | Kurkure .................. 351/246 |
| 2002/0105482 | A1 | 8/2002 | Lemelson et al. |

(Continued)

FOREIGN PATENT DOCUMENTS

| CN | 1937813 A | 3/2007 |
| CN | 101458560 A | 6/2009 |

(Continued)

OTHER PUBLICATIONS

CN 201080059053.0 Office Action, Mailed Sep. 3, 2014.

(Continued)

*Primary Examiner* — Peling Shaw
(74) *Attorney, Agent, or Firm* — Troutman Sanders LLP; James E. Schutz; Christopher W. Glass

(57) ABSTRACT

A method 300 and device for visual compensation captures 330 an image using an imager, detects 360 whether eyeglasses are present in the image, and sets 363 an electronic visual display to a normal font size, if eyeglasses are detected as present in the image. If eyeglasses are not detected as present in the image, the electronic visual display is set 367 to a larger font size. The method and device can be triggered 320 (for example) by an incoming call or message, by a touch screen activation, a key press, or by a sensed motion of the device. The method can be repeated from time to time to detect whether a user has taken off eyeglasses (or put on eyeglasses) after the first image capture. The method and device compensates for users with presbyopia (and some other types of visual impairments) who intermittently wear glasses.

17 Claims, 3 Drawing Sheets

(56) References Cited

U.S. PATENT DOCUMENTS

| | | | |
|---|---|---|---|
| 2004/0246272 A1 | 12/2004 | Ramian | |
| 2008/0002964 A1* | 1/2008 | Edwards | 396/374 |
| 2009/0164896 A1* | 6/2009 | Thorn | 715/700 |
| 2009/0279786 A1* | 11/2009 | Kasugai et al. | 382/195 |
| 2009/0291757 A1 | 11/2009 | Hilbert et al. | |

FOREIGN PATENT DOCUMENTS

| | | | |
|---|---|---|---|
| CN | 101515959 A | 8/2009 | |
| EP | 1426919 A1 | 6/2004 | |
| EP | 1939582 B1 | 7/2008 | |
| EP | 1522920 B1 | 6/2013 | |
| WO | 2005/025081 A1 | 3/2005 | |
| WO | 2009081239 A1 | 7/2009 | |

OTHER PUBLICATIONS

Patent Cooperation Treaty, "PCT Search Report and Written Opinion of the International Searching Authority" for International Application No. PCT/US2010/061425, Mar. 29, 2011, 11 pages.

Ron Cain and George B. Singleton, "Laptop Computer-Based Facial Recognition System Assessment", Mar. 2001, pp. 1-24, Oak Ridge, Tennessee, USA.

United States Patent and Trademark Office, "Notice of Allowance" for U.S. Appl. No. 12/645,557, Mar. 27, 2012, 13 pages.

RU 2012131230 Official Russian Decision of Grant, Mailed Dec. 4, 2014.

CN 201080059053.0 Notification of Second Office Action, mailed Feb. 15, 2015.

* cited by examiner

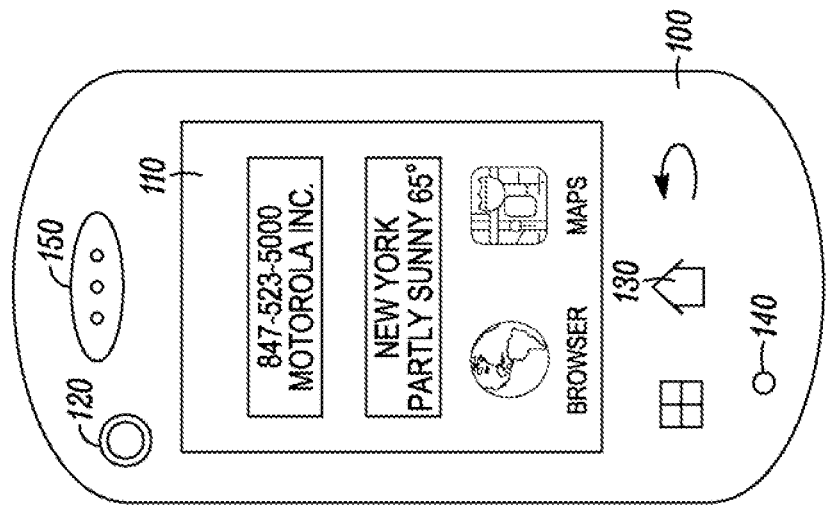
FIG. 2
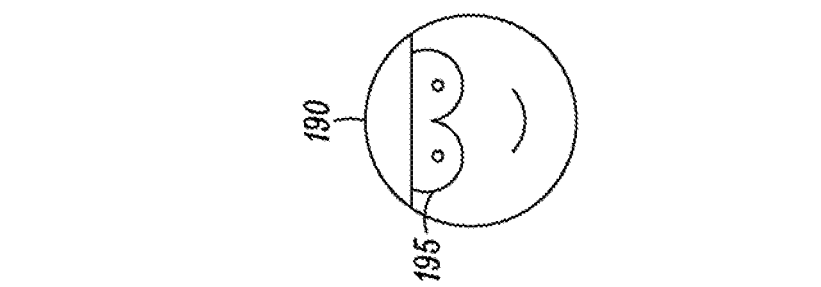
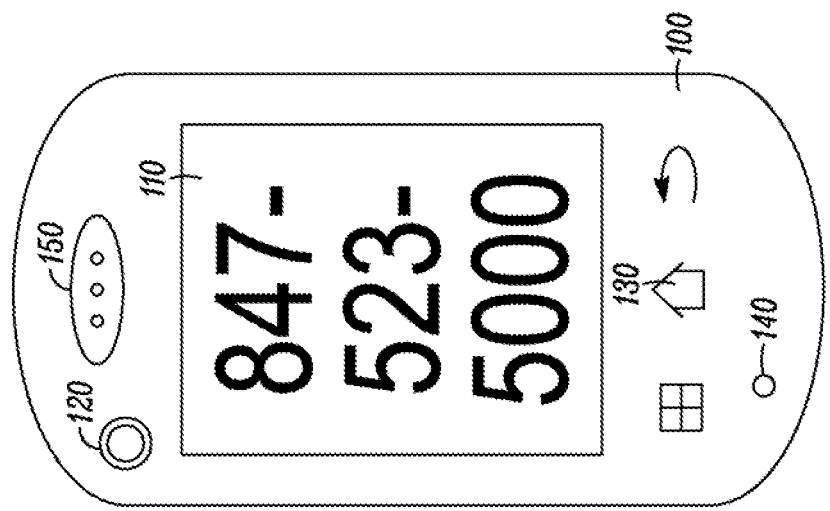
FIG. 1
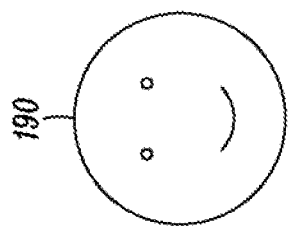

METHOD AND DEVICE FOR VISUAL COMPENSATION

CROSS-REFERENCE TO RELATED APPLICATION

This application is a continuation application claiming the benefit under 35 U.S.C. §120 of U.S. patent application Ser. No. 12/645,577, filed Dec. 23, 2009, now U.S. Pat. No. 8,305, 433, the entire contents and substance of which is hereby incorporated by reference as if fully set forth below in its entirety.

FIELD

This invention relates generally to devices with electronic visual displays, and more particularly to displaying text and images for users who occasionally wear glasses.

BACKGROUND

Some users of devices with electronic visual displays suffer from presbyopia, which results in difficulty focusing on nearby objects. This can produce eyestrain when reading text or viewing images at close range. Generally presbyopia is treated using corrective lenses such as reading glasses. Often, these reading glasses are worn intermittently. If a user unexpectedly needs to view an electronic visual display, reading glasses may not be conveniently available. For example, a mobile phone rings and a user would like to read the caller ID but her reading glasses are in another room or in a purse.

Although many devices with electronic visual displays have settings that can be adjusted to display text using larger font sizes, often a user must first navigate through a menu that is displayed using "normal" font sizes. Thus, ironically, the process of increasing font sizes to address reading difficulties becomes burdensome.

Further complications result when a user sometimes would like larger font sizes and sometimes would like smaller font sizes. Thus, there is an opportunity to accommodate users with presbyopia such that electronic visual displays are easier to read.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 1-2 show use of a device for visual compensation in accordance with an embodiment.

Figure 3:
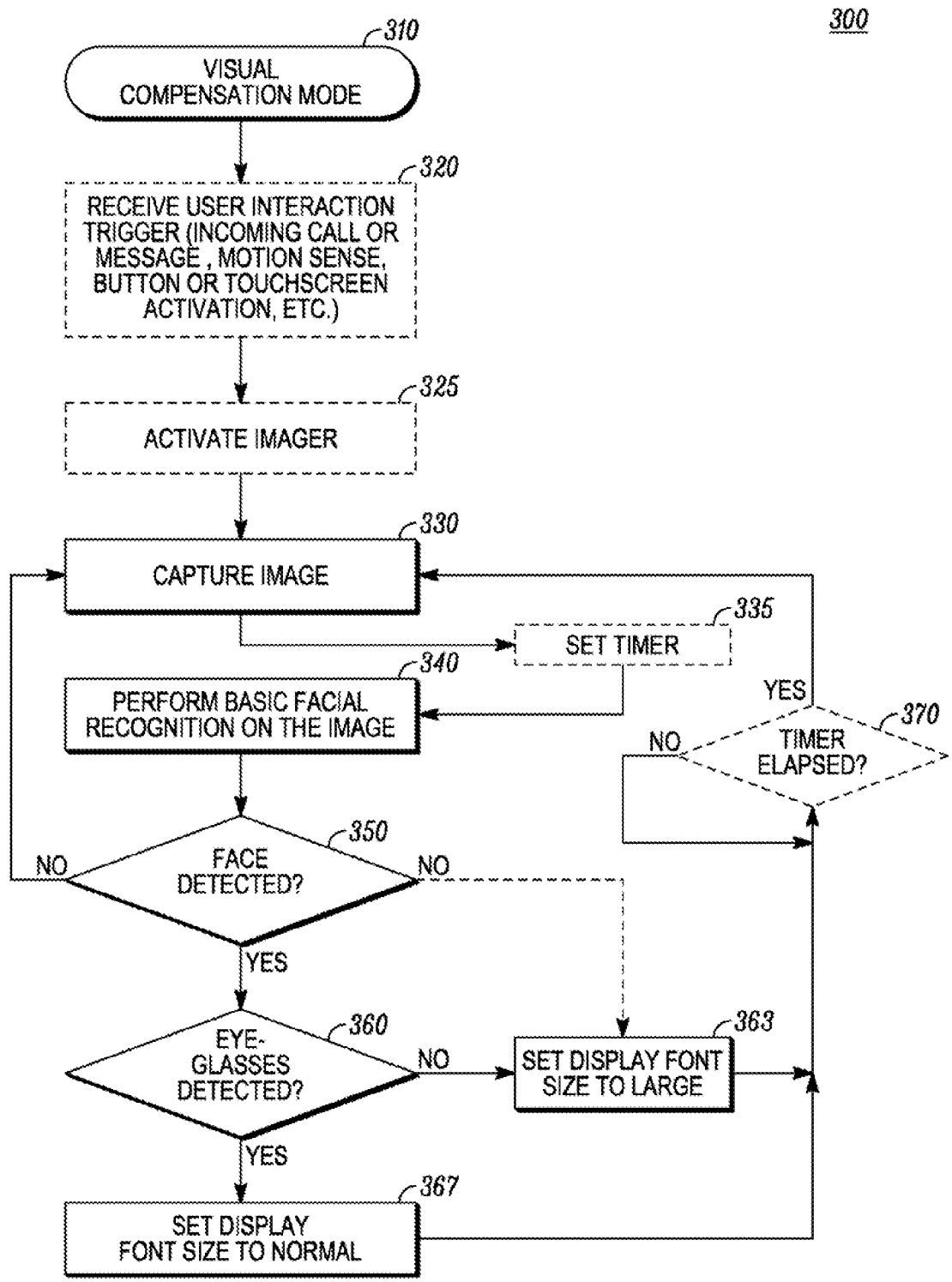
FIG. 3 shows a flow chart for a method of visual compensation in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and device for visual compensation uses a digital camera to capture an image of a user of the device. A facial recognition engine in the device detects whether a face is present in the image and whether eyeglasses are present or absent. If eyeglasses are absent in the image, an electronic visual display of the device uses a larger font size than if eyeglasses were detected. The method and device helps to compensate visually for a user with presbyopia who occasionally wears glasses. If the user is wearing reading glasses as detected in the image, then the display uses a normal font size. If, however, reading glasses are absent from the image, then the display uses a larger font size to assist the user in reading text.

This method and device may also be helpful for a user who has severe myopia. In another situation, a user who generally wears glasses puts the mobile phone on a nightstand for use as a clock. When the user awakens in the middle of the night and touches the mobile phone to cause a user interaction trigger, the method and device captures an image (in the dark; probably resulting in underexposure), fails to detect that the user is wearing glasses, and increases the font size of the clock display to improve the readability of the time shown.

FIGS. 1-2 show use of a device 100 for visual compensation in accordance with an embodiment. The device 100 of FIGS. 1-2 is shown as a mobile telephone, however, the device may be any number of devices with an electronic visual display 110 including computers (desktop or laptop), electronic books, personal digital assistants or organizers, or other devices with electronic visual displays intended for viewing at arm's length (i.e., 1 meter) or less.

The device 100 includes a digital camera 120 or other type of imager directed in substantially the same direction as the display 110. In some implementations, the imager may be integrated into the display itself or situated behind the display (toward the interior of the device 100). The camera captures an image when it receives a user interaction trigger. The user interaction trigger can be (for example) an incoming call or message, a touch screen interaction or key press, or a detected motion of the device 100. As devices increase in sophistication, other user interaction triggers may be developed. Generally, a user interaction trigger is any signal that would cause the display to be active and thus anticipate visual interaction between the device and the user.

Hopefully, at the time the camera 120 is capturing the image, the user is in front of the display 110 and the image will include an acceptable depiction of the face of the user. A processor (not shown) with a simple facial recognition engine detects whether a face is present in the image. If the facial recognition engine cannot detect a face at all, the processor may seek to capture a replacement image. If the facial recognition detects a face, it determines whether eyeglasses are present. In FIG. 1, the user 190 is not wearing glasses. In this situation, the facial recognition engine has detected a face without eyeglasses. In response, the processor sets the font size of displayed text on the electronic visual display 110 to a large font size. The specific font size may be previously selected by the user.

In FIG. 2, the user 190 is wearing eyeglasses 195. In this situation, the facial recognition engine detects the face with glasses, and the displayed text on the electronic visual display 110 is set to a normal font size as previously selected by the user or predetermined by a manufacturer or software application.

The image capture, image analysis, and font size setting process can be repeated from time to time. If an initial user interaction trigger results in capture of an image of a face without glasses, the displayed font size will be set larger than normal. The user may subsequently put on glasses, and a later image capture, image analysis, and font setting process would result in a normal font size on the display. The repetition may be based on time (e.g., every 60 seconds) while the display is active, may be based on further user interaction triggers, or may be based on a combination of both time and further user interaction triggers. The repetition time may vary (e.g., from 15 seconds to 30 seconds to 60 seconds) and/or halt (e.g., after repeating for 5 minutes, the process stops and the font size stays constant).

The device 100 shown includes other components generally found in mobile telephones, such as an audio speaker 150, a keypad 130, and a microphone 140. Of course, other components may be implemented in other versions of the device.

FIG. 3 shows a flow chart 300 for a method of visual compensation in accordance with an embodiment. Initially, a device for visual compensation (such as the device 100 in FIGS. 1-2) is set to a visual compensation mode 310. The visual compensation mode was originally developed for users with presbyopia, but may also be appropriate for users with other types of visual problems (such as severe myopia) when the user sometimes wears glasses and sometimes does not wear glasses. In any event, the user may activate the mode as a device setting and the device will continue in that mode until the visual compensation mode is inactivated.

When the device receives 320 a user interaction trigger, the imager in the device is activated 325 (if it was not previously active) and captures 330 an image. A user interaction trigger can be any signal that would cause the display to be active. Examples of user interaction triggers are: incoming call or message signals, touch screen interactions, key presses, or detected motion of the device using an accelerometer. In some situations, the steps of receiving 320 and activating 325 are optional, because the step of capturing 330 is automatic upon entering the visual compensation mode 310. In a mobile telephone implementation, however, power savings can be achieved by only capturing 330 images under certain circumstances.

After an image is captured, a facial recognition engine implemented in a processor of the device performs 340 a basic facial recognition algorithm on the image. The facial recognition engine determines 350 if a face is detected in the image. If no face is present (or no face can be detected), the flow returns to the step of capturing 330 an image to obtain a replacement image. If a face is present, the facial recognition engine determines 360 whether eyeglasses are detected on the face. If no eyeglasses are detected, the processor sets 363 the display font size to a large font size. This is beneficial when a user with presbyopia has received an incoming phone call or message, and has picked up the device without first putting on glasses. Note that, if no face was detected 350, the flow may go directly to setting 363 the display font size to large. This alternate path may be useful in situations where the image is too dark (or too bright or too blurry) to detect a face, or the camera has captured an image before the user is positioned to look at the display. In such situations, the device defaults to a large font size and may later be changed to a normal font size during a subsequent iteration through the flow chart 300 or via a specific user command.

If the user is wearing glasses at the time the image is taken, the processor sets 367 the display font size to a normal font size. After the display font size is set 363, 367, an optional timer is checked. The timer is set 335 right after capturing 330 the image. The timer may be constant (e.g., 60 seconds) or variable (first 15 seconds, next 30 seconds, next 30 seconds, next 60 seconds, etc.). After the timer elapses 370, the flow returns to capturing 330 an image and the process repeats as necessary. Thus, as a user puts on or removes reading glasses, the font size may change dynamically based on whether images captured at various times are detected to include faces wearing eyeglasses.

Some implementations may assume that, after eyeglasses are put on, the user will not remove them. In this case, the process may end after setting 367 the display font size to normal. Some implementations may assume that, if no change in the results of the image capture and image analysis have occurred in a predetermined number of iterations (e.g., 10 iterations) or after a predetermined period of time (e.g., 10 minutes), no further change is expected. In that case, the process may end after the predetermined number of iterations or predetermined time period lapses.

Figure 4:
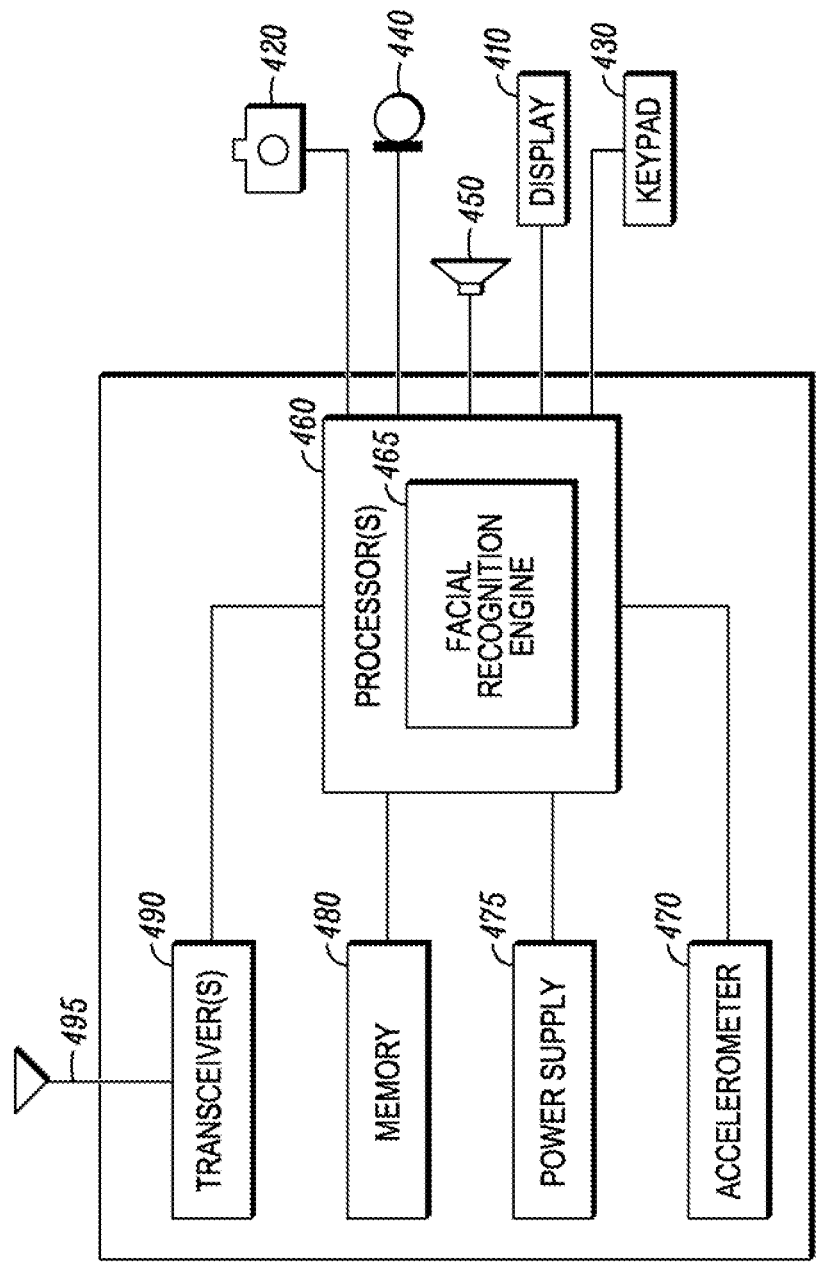
FIG. 4 shows a basic schematic for the device shown in FIGS. 1-2.

FIG. 4 shows a basic schematic for the device 100 shown in FIGS. 1-2 which is capable of implementing the flow chart shown in FIG. 3. As mentioned previously, the implementation shown is for a mobile telephone, and thus the device 100 includes an antenna 495 and at least one transceiver 490 for receiving and transmitting wireless signals. The device also includes at least one processor 460 electrically coupled to the transceiver 490 for receiving (among other things) incoming call signals and incoming message signals. The processor 460 is electrically coupled to a memory 480, which can be read-only memory, random-access memory, and/or other types of memory for storing operating systems and software applications as well as user-level data. A power supply 475 supports the processor 460 (and other components in the device 100) as needed.

An electronic visual display 410 is coupled to the processor 460, and the processor controls the output of the display. The display can be an output-only display or it can be a touch screen or other type of display that also accepts inputs. An imager 420 is also coupled to the processor 460. The imager can be a digital camera facing the same direction as the display for capturing an image of a user looking at the display. A facial recognition engine 465 implemented in the processor 460 analyzes the captured image for a face and whether the face is wearing eyeglasses.

An accelerometer 470 is useful for detecting user interaction with the device 100. If a user picks up the device in anticipation of dialing a phone number or creating a message, the accelerometer may detect the movement and trigger the process outlined in FIG. 3. Other sensors or input components, (such as keys of a keypad 430, the touch sensor of a touch screen or touch pad, or even the activation of a microphone 440 or audio speaker 450) may also be used to trigger the flow chart 300 of FIG. 3.

The method and device for visual compensation provides a handy way to dynamically switch font sizes, which is helpful for users with presbyopia and some other types of visual impairments. With a digital camera and a simple facial recognition engine, faces with or without glasses can be detected by the device. If the device detects a face wearing glasses, corrected vision is assumed and the display uses a normal font. If the device detects a face not wearing glasses (or cannot detect a face at all), uncorrected vision is assumed and the display uses a larger font. The process of image capture and image analysis can be repeated from time to time to dynamically change font size as glasses are put on (or taken off).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for visual compensation comprising:
capturing an image using an imager;
detecting whether eyeglasses are present in the image; and
setting an electronic visual display to a normal font size, if eyeglasses are detected as present in the image.

2. A method according to claim 1 further comprising:
setting the electronic visual display to a larger font size, if eyeglasses are not detected as present in the image.

3. A method according to claim 1 further comprising:
activating the imager in response to receiving a user interaction trigger, prior to the capturing.

4. A method according to claim 1 further comprising:
performing facial recognition on the image.

5. A method according to claim 4 further comprising:
capturing a replacement image using the imager, if no face is detected as present in the image.

6. A method according to claim 4 further comprising:
setting the electronic visual display to the larger font size, if no face is detected as present in the image.

7. A method according to claim 1 further comprising:
capturing another image using the imager after a timer has elapsed.

8. A method according to claim 7 further comprising:
starting the timer after capturing the image.

9. A method according to claim 1 further comprising:
aligning the imager to face the same direction as the electronic visual display, prior to the capturing.

10. A device for visual compensation comprising:
an imager, for capturing an image;
a processor, coupled to the imager, for:
detecting if eyeglasses are in the image, and
setting a font size to "normal" if eyeglasses are detected in the image;
an electronic visual display, coupled to the processor, for displaying using the font size.

11. A device according to claim 10 wherein the processor is also for:
setting the font size to "large" if eyeglasses are not detected in the image.

12. A device according to claim 10 further comprising:
a receiver, coupled to the processor, for receiving an incoming call or message signal.

13. A device according to claim 10 further comprising:
an accelerometer, coupled to the processor, for detecting a movement of the 25 device.

14. A device according to claim 10 further comprising:
a memory, coupled to the processor, for storing the font size setting of "normal".

15. A device according to claim 14 wherein the memory also stores the font size setting of "large".

16. A device according to claim 10 further wherein the processor comprises:
a facial recognition engine for the detecting.

17. A device according to claim 10 further comprising:
a key.

* * * * *